United States Patent
Alapati et al.

(10) Patent No.: US 12,506,721 B1
(45) Date of Patent: Dec. 23, 2025

(54) SYSTEMS AND METHODS FOR CONFIGURING SECURE LINKS

(71) Applicant: Juniper Networks, Inc., Sunnyvale, CA (US)

(72) Inventors: Arun Kumar Alapati, Bangalore (IN); Shubhadeep Ghosh, Bangalore (IN)

(73) Assignee: Juniper Networks, LLC., Sunnyvale, CA (US)

(*) Notice: Subject to any disclaimer, the term of this patent is extended or adjusted under 35 U.S.C. 154(b) by 321 days.

(21) Appl. No.: 18/312,027

(22) Filed: May 4, 2023

(51) Int. Cl.
  *H04L 9/40* (2022.01)
(52) U.S. Cl.
  CPC ...... *H04L 63/0485* (2013.01); *H04L 63/0869* (2013.01); *H04L 63/20* (2013.01)
(58) Field of Classification Search
  CPC .. H04L 63/0485; H04L 63/0869; H04L 63/20
  See application file for complete search history.

(56) References Cited

U.S. PATENT DOCUMENTS

| | | | | |
|---|---|---|---|---|
| 7,207,063 | B1* | 4/2007 | Fluhrer | H04L 63/0281 713/153 |
| 7,430,757 | B1* | 9/2008 | Chari | H04L 63/20 713/160 |
| 2012/0246463 | A1 | 9/2012 | Shea | |
| 2013/0042106 | A1 | 2/2013 | Persaud | |
| 2020/0259836 | A1 | 8/2020 | Kumar | |
| 2020/0320219 | A1 | 10/2020 | Barouch | |
| 2021/0099450 | A1 | 4/2021 | Jain | |

OTHER PUBLICATIONS

Extended European Search Report for European Application No. 23207470.8, dated Apr. 24, 2024; 8 pgs.

\* cited by examiner

*Primary Examiner* — Trong H Nguyen
(74) *Attorney, Agent, or Firm* — Greenberg Traurig, LLP

(57) ABSTRACT

A computer-implemented method for configuring secure links may include receiving, by a computing device, a request to establish an encrypted link from a peer device in a network. The method may also include identifying, by the computing device, a data type of the request to establish the encrypted link. The method may then include determining, by the computing device, that the data type is supported by the computing device. Additionally, the method may include extracting, by the computing device from the request, a whitelist of protocols to send without encryption. Furthermore, the method may include automatically reconfiguring, by the computing device, a configuration setting of the computing device to whitelist one or more protocols from the whitelist of protocols. Finally, the method may include sending, by the computing device, a response to the peer device to accept the request. Various other methods, systems, and computer-readable media are also disclosed.

20 Claims, 7 Drawing Sheets

SYSTEMS AND METHODS FOR CONFIGURING SECURE LINKS

BACKGROUND

In computer networks, computing devices often create secure links between each other to exchange data with a dedicated method that provides more security than typical methods of exchanging network packets. For example, two peer devices on a network may execute a handshake procedure that initially exchanges encryption keys to configure a secured link to exchange encrypted data packets. By creating such a link and establishing an exchange session, devices may be able to encrypt data packets prior to sending and decrypt the packets after receiving, thereby adding a layer of security to the data being sent and received.

However, until the handshake procedure is completed and both peer devices have the necessary keys and appropriate configuration settings, data packets that are sent by one peer may be dropped by the other. During this vulnerable window, essential data such as protocol messages may also be dropped. For some types of data exchange sessions, users may be able to configure the secured link to forego encrypting certain types of packets. For example, packets that contain protocol messages may be determined to not need encryption during the handshake process until keys are established. However, protocol messages often require a response from the receiving peer, and a peer device that is waiting to establish a link may drop a received protocol message that is not encrypted and not in an expected format, preventing establishment of the session. In some cases, both peers may be manually configured to accept unencrypted packets for protocol messages. However, this may be difficult for peer devices in physically distant locations and may take much longer to manually configure for a network with a multitude of peer devices. The instant disclosure, therefore, identifies and addresses a need for additional and improved systems and methods for configuring secure links between peer devices.

SUMMARY

As will be described in greater detail below, the instant disclosure describes various systems and methods for configuring secure links by automating a handshake process to determine what types of packets are encrypted or not encrypted. In one example, a computer-implemented method for configuring secure links may include receiving, by a computing device, a request to establish an encrypted link from a peer device in a network. The method may also include identifying, by the computing device, a data type of the request to establish the encrypted link. The method may then include determining, by the computing device, that the data type is supported by the computing device. Additionally, the method may include extracting, by the computing device from the request, a whitelist of protocols to send without encryption. Furthermore, the method may include automatically reconfiguring, by the computing device, a configuration setting of the computing device to whitelist one or more protocols from the whitelist of protocols. Finally, the method may include sending, by the computing device, a response to the peer device to accept the request.

In addition, a corresponding system for configuring secure links may include several modules stored in memory, including (i) a reception module that receives, by a computing device, a request to establish an encrypted link from a peer device in a network, (ii) an identification module that identifies, by the computing device, a data type of the request to establish the encrypted link, (iii) a determination module that determines, by the computing device, that the data type is supported by the computing device, (iv) an extraction module that extracts, by the computing device from the request, a whitelist of protocols to send without encryption, (v) a configuration module that automatically reconfigures, by the computing device, a configuration setting of the computing device to whitelist one or more protocols from the whitelist of protocols, and (vi) a sending module that sends, by the computing device, a response to the peer device to accept the request. The system may also include one or more hardware processors that execute the reception module, the identification module, the determination module, the extraction module, the configuration module, and the sending module.

In some examples, the above-described method may be encoded as computer-readable instructions on a computer-readable medium. For example, a non-transitory computer-readable medium may include one or more computer-executable instructions that, when executed by one or more processors of a computing device, may cause the computing device to (i) receive a request to establish an encrypted link from a peer device in a network, (ii) identify a data type of the request to establish the encrypted link, (iii) determine that the data type is supported by the computing device, (iv) extract, from the request, a whitelist of protocols to send without encryption, (v) automatically reconfigure a configuration setting of the computing device to whitelist one or more protocols from the whitelist of protocols, and (vi) send a response to the peer device to accept the request.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
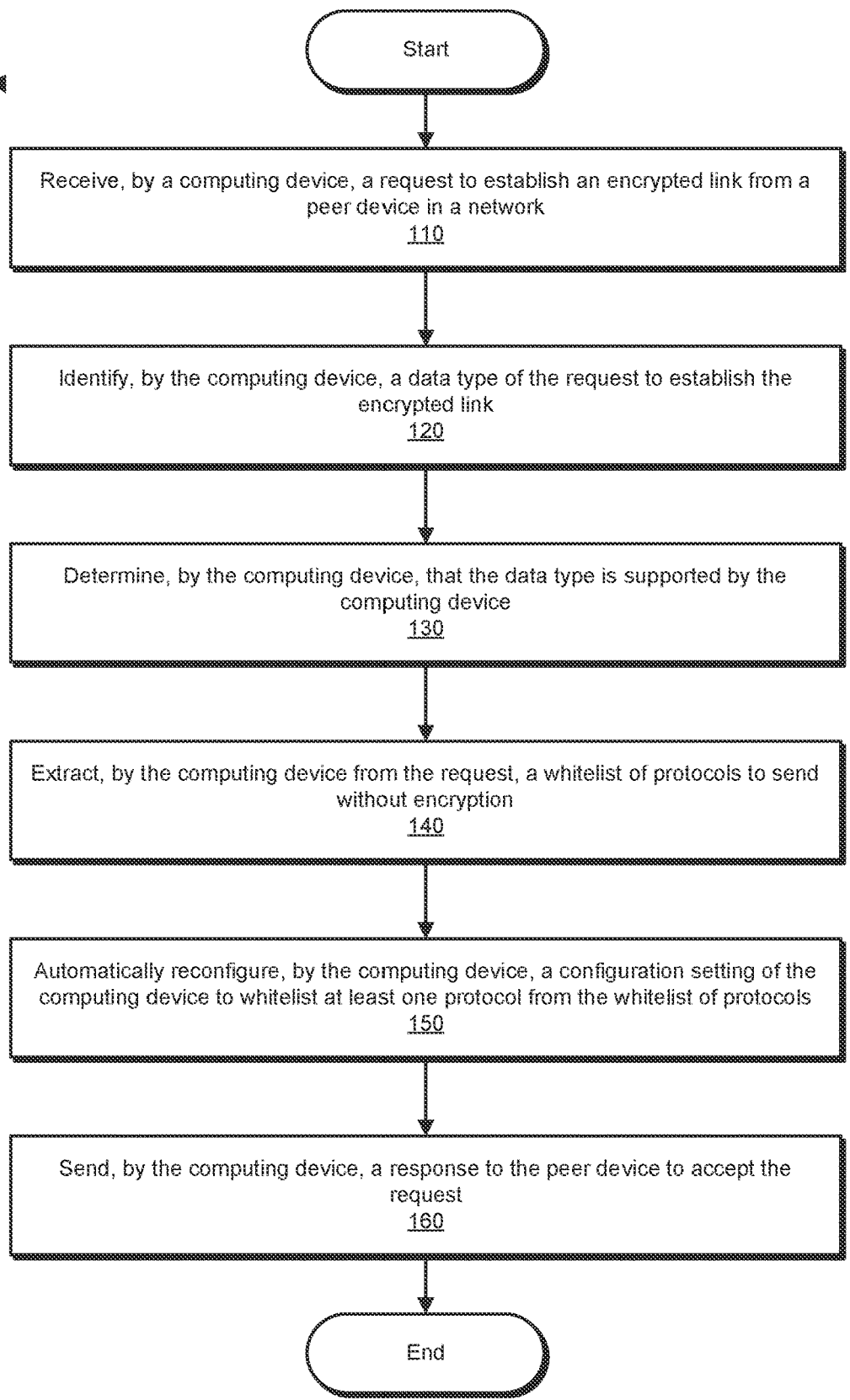
FIG. 1 is a flow diagram of an example method for configuring secure links.

Throughout the drawings, identical reference characters and descriptions indicate similar, but not necessarily identical, elements. While the example embodiments described herein are susceptible to various modifications and alternative forms, specific embodiments have been shown byway of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for configuring secure links. As will be explained in greater detail below, embodiments of the instant disclosure may define a mechanism to automatically configure peer devices attempting to establish a secure link by exchanging whitelists of protocols to not encrypt during a handshake process between the peer devices. For example, by sending a whitelist of protocols within the data fields of an initial request to establish a secure link, a peer device may indicate to a receiving device what types of protocol packets to avoid encrypting during the handshake process. By storing the whitelist in the initial request, such as within an expanded data type field, the systems and methods described herein may provide the whitelist as part of the process to establish the link. The peer device receiving the request may then identify the data type of the request and determine that the data type is supported. Additionally, the peer device receiving the request may extract the whitelist of protocols from the request, thereby identifying the protocols to avoid encrypting during the process of establishing the encrypted link.

The disclosed systems and methods may also automatically reconfigure the receiving device to whitelist the same protocols as the peer device sending the request. The disclosed systems and methods may automatically exchange whitelisted protocols from both ends of an attempt to establish a secure link and may configure both peer devices based on the shared whitelists. The disclosed systems and methods may then send whitelisted protocol packets without encryption during the establishment of the encrypted link and may send other types of packets with encryption for protocols that are not whitelisted. A peer device may also send a secure channel index in the request to establish the link, and the receiving peer device may configure a secure channel based on receiving the secure channel index. In some examples, the systems and methods described herein may determine a data type is unsupported by the computing device and may send a negative acknowledgement response to the peer device requesting the link. Furthermore, the disclosed systems and methods may notify a user of the peer device about the negative acknowledgement response, which may indicate a mismatch in the configuration settings of the peer devices.

In addition, the systems and methods described herein may improve the functioning of a computing device by automating the process to request and establish an encrypted link between the computing device and a peer device without dropping necessary protocol messages during the establishment of the link. These systems and methods may also improve the fields of data security and network security by ensuring data packets that are not whitelisted continue to be encrypted for sending between peer devices in a network. Thus, the disclosed systems and methods may improve over typical methods of configuring secure links between peer devices.

The following will provide, with reference to FIG. 1, detailed descriptions of computer-implemented methods for configuring secure links. Detailed descriptions of a corresponding example system will be provided in connection with FIG. 2. Detailed descriptions of an example request to establish an encrypted link with example data fields will be provided in connection with FIG. 3. In addition, detailed descriptions of an example encrypted link established by example authenticators and example packet encryption will be provided in connection with FIG. 4. Detailed descriptions of an example establishment of an example secure channel will also be provided in connection with FIG. 5. Furthermore, detailed descriptions of an example negative acknowledgement response will be provided in connection with FIG. 6. Finally, detailed descriptions of an example mismatch in example configuration settings will be provided in connection with FIG. 7.

FIG. 1 is a flow diagram of an exemplary computer-implemented method 100 for configuring secure links. The steps shown in FIG. 1 may be performed by any suitable computer-executable code and/or computing system, including system 200 illustrated in FIG. 2. In one example, each of the steps shown in FIG. 1 may represent an algorithm whose structure includes and/or is represented by multiple sub-steps, examples of which will be provided in greater detail below.

Figure 2:
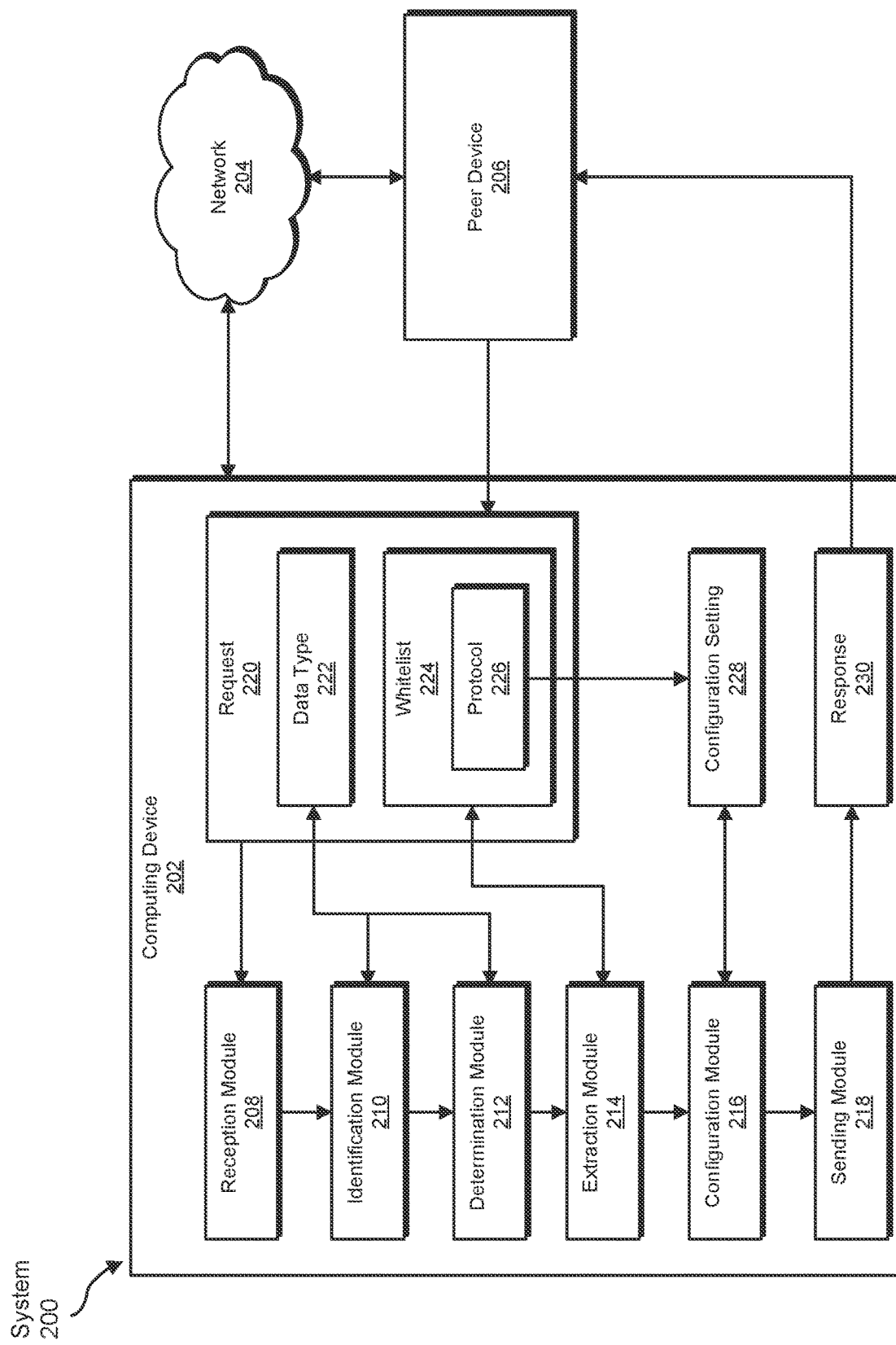
FIG. 2 is a block diagram of an example system for configuring secure links.

As illustrated in FIG. 1, at step 110 one or more of the systems described herein may receive, by a computing device, a request to establish an encrypted link from a peer device in a network. For example, FIG. 2 is a block diagram of an exemplary system 200 for configuring secure links. As illustrated in FIG. 2, a reception module 208 may, as part of a computing device 202, receive a request 220 to establish an encrypted link from a peer device 206 in a network 204.

The systems described herein may perform step 110 in a variety of ways. In one example, computing device 202 and peer device 206 of FIG. 2 may generally represent any type or form of computing device or server that may be programmed with the modules of FIG. 2 and/or may store all or a portion of the data described herein. For example, computing device 202 and peer device 206 may represent devices or servers that are capable of establishing an encrypted link to other devices or servers and that may be capable of reading computer-executable instructions. As another example, computing device 202 may represent a client device that is capable of receiving request 220 from peer device 206 representing another client device, and computing device 202 and peer device 206 may be capable of encrypting and decrypting data sent and received over the encrypted link.

Examples of computing device 202 and/or peer device 206 include, without limitation, network devices, routers (such as provider edge routers, hub routers, spoke routers, autonomous system boundary routers, and/or area border routers), switches, hubs, modems, bridges, repeaters, gateways (such as broadband network gateways), multiplexers, network adapters, network interfaces, laptops, tablets, desktops, servers, cellular phones, personal digital assistants (PDAs), multimedia players, embedded systems, wearable devices, gaming consoles, portions of one or more of the same, variations or combinations of one or more of the same, and/or any other suitable computing devices. Additional examples of such devices include, without limitation, application servers and/or database servers configured to provide various database services and/or run certain software applications, such as media storage and streaming services.

In some examples, computing device 202 and/or peer device 206 may be equipped with circuitry and/or hardware configured and/or programmed to perform one or more of the tasks and/or actions described herein. For example, such circuitry may include and/or represent one or more electrical and/or electronic circuits capable of processing, applying, modifying, transforming, transmitting, receiving, and/or executing instructions and/or data for computing device 202 and/or peer device 206. In one example, such circuitry may access, read, write, and/or allocate memory in connection with configuring secure links. Additionally or alternatively, such circuitry may receive, handle, process, and/or forward traffic (e.g., data and/or control packets) on computing device 202 and/or peer device 206.

In some embodiments, computing device 202 and peer device 206 may be in communication with each other or with other computing devices via network 204. In such embodiments, network 204 may include and/or represent any medium or architecture capable of facilitating communication or data transfer. In one example, network 204 may include and/or represent wireless or wired connections. Examples of networks include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), or the like.

In some examples, the term "encrypted link" may refer to a connection that typically encrypts communication sent between computing devices. In some examples, the term "encryption" may refer to a process of transforming data to prevent unauthorized access, such as by requiring a key to decrypt the encrypted data to reveal the original data.

In some embodiments, request 220 to establish the encrypted link may include a protocol layer request to authenticate the encrypted link between computing device 202 and peer device 206. In some examples, the term "protocol layer" may refer to a network abstraction layer in which protocol data is exchanged in a network. In these examples, peer devices may be known to each other and determined to be up and running. In one example, a protocol layer request may include an Extensible Authentication Protocol (EAP) request, wherein EAP may represent a framework supporting multiple authentication methods and may establish a secure link by exchanging a series of request and response packets between an authenticator and a peer device.

In some embodiments, the encrypted link may include a Media Access Control security (MACsec) link or an Internet Protocol Security (IPsec) link. In these embodiments, MACsec may provide point-to-point security on network or ethernet links, and IPsec may include a different method to authenticate and encrypt data packets over a network. In these embodiments, request 220 may represent a request to establish a MACsec Key Agreement (MKA) session. In other embodiments, the encrypted link may use alternate methods to secure a link between devices on a network.

Returning to FIG. 1, at step 120, one or more of the systems described herein may identify, by the computing device, a data type of the request to establish the encrypted link. For example, an identification module 210 may, as part of computing device 202 in FIG. 2, identify a data type 222 of the request to establish the encrypted link.

Figure 4:
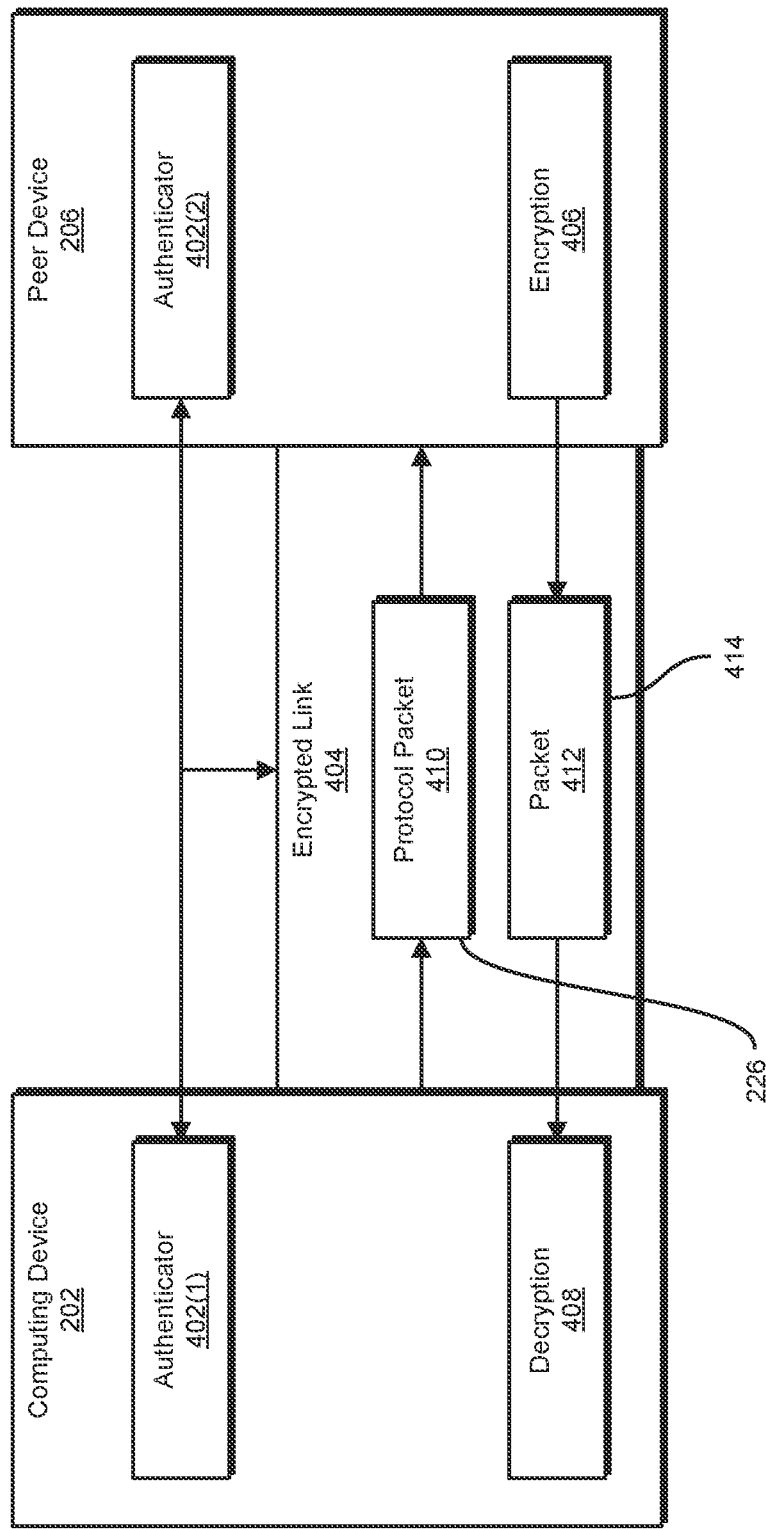
FIG. 4 is a block diagram of an example encrypted link established by example authenticators and example packet encryption.

The systems described herein may perform step 120 in a variety of ways. In some examples, data type 222 may include an expanded data type that may be set by an authenticator of peer device 206. For example, data type 222 may be set by the authenticator or an MKA master using an MKA protocol for an MKA session. In these examples, the term "authenticator" may refer to a device or process for verifying the identity of users or peer devices. As illustrated in FIG. 4, computing device 202 and peer device 206 may each include an authenticator 402(1) and an authenticator 402(2), respectively. In this example, authenticators 402(1)-(2) may set data type 222 of FIG. 2, such as by authenticator 402(2) setting data type 222 of request 220 before peer device 206 sends request 220 to computing device 202.

Figure 3:
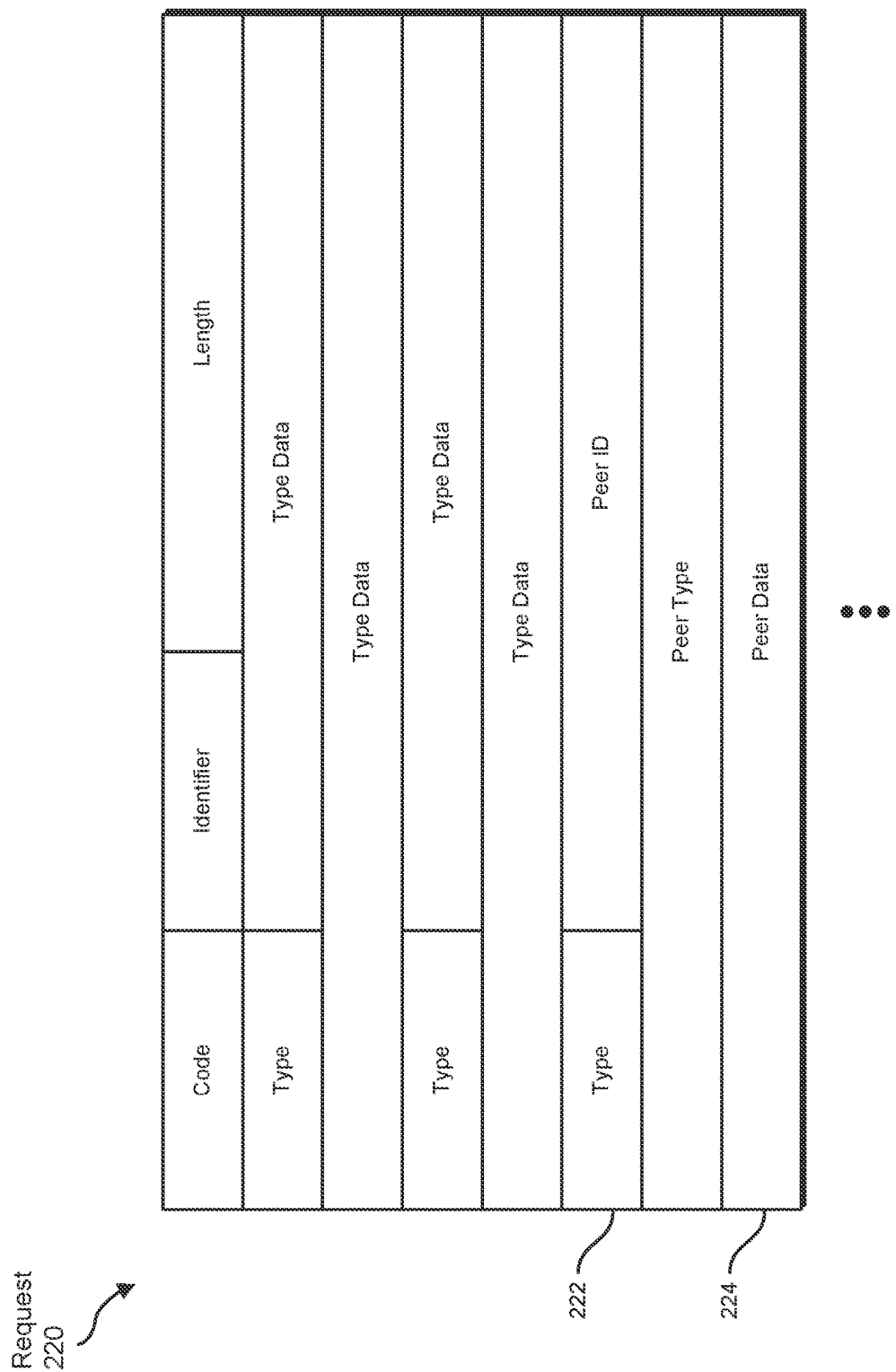
FIG. 3 is a block diagram of an example request to establish an encrypted link with example data fields.

As shown in FIG. 3, request 220 may represent an EAP packet that includes data fields indicating a code, an identifier, a length, a data type, and additional data for that data type. For example, the code for request 220 may indicate to computing device 202 that request 220 is a request and not a response or a different type of data packet. In these examples, the expanded data type may include a vendor type, such as a type of peer device 206, and additional vendor data, which may include data about peer device 206 sending request 220. In the example of FIG. 3, peer ID, peer type, and peer data may refer to vendor identification, vendor type, and vendor data in the example of an EAP packet. In these examples, an expanded data type may include a field indicating a type as well as a field of additional type data, such as the above-described peer ID, peer type, and peer data. In these examples, the type field may include data type 222, which may indicate the following fields of request 220 include data about peer device 206.

Returning to FIG. 1, at step 130, one or more of the systems described herein may determine, by the computing device, that the data type is supported by the computing device. For example, a determination module 212 may, as part of computing device 202 in FIG. 2, determine that data type 222 is supported by computing device 202.

The systems described herein may perform step 130 in a variety of ways. In one embodiment, determination module 212 may determine that request 220 is an EAP request and that data type 222 is an expanded data type that includes data on peer device 206. In this embodiment, determination module 212 may then determine that computing device 202 is capable of parsing data of data type 222 from request 220. In some embodiments, determination module 212 may determine that an authentication type of request 220, as indicated by data type 222, is supported by computing device 202.

Returning to FIG. 1, at step 140, one or more of the systems described herein may extract, by the computing device from the request, a whitelist of protocols to send without encryption. For example, an extraction module 214 may, as part of computing device 202 in FIG. 2, extract, from request 220, a whitelist 224 of protocols to send without encryption.

The systems described herein may perform step 140 in a variety of ways. In some examples, the term "whitelist" may refer to a list of approved or authorized entities, which may include specific computing devices, applications, and/or user accounts, and/or a process for adding an entity to such a list. In these examples, a whitelist of protocols may include a list of approved protocols that do not require encryption. In some examples, the term "protocol" may refer to a set of rules or regulations that defines how data is transmitted or formatted.

As shown in the example of FIG. 3, extraction module 214 may extract whitelist 224 from the peer data field of request 220. For example, identification module 210 may identify data type 222 and determine that the peer data field may include whitelist 224 indicating protocols that peer device 206 prefers to send and receive in clear text, without encryption. In the example of an EAP request, peer device 206 may send whitelist 224 by piggybacking on a vendor type field of request 220. In other examples, whitelist 224 may be included in other fields of request 220, and extraction module 214 may extract whitelist 224 based on the location of data type 222 within request 220.

Returning to FIG. 1, at step 150, one or more of the systems described herein may automatically reconfigure, by the computing device, a configuration setting of the computing device to whitelist at least one protocol from the whitelist of protocols. For example, a configuration module 216 may, as part of computing device 202 in FIG. 2, automatically reconfigure a configuration setting 228 of computing device 202 to whitelist a protocol 226 from whitelist 224.

The systems described herein may perform step 150 in a variety of ways. In some examples, the term "configuration setting" may refer to a setting or a set of parameters that defines a functionality of a computing device, such as the way data is transmitted or encrypted. In some embodiments, configuration module 216 may reconfigure configuration setting 228 to whitelist all protocols within whitelist 224. For example, whitelist 224 may include all protocols whitelisted by peer device 206, and configuration module 216 may reconfigure configuration setting 228 to mirror the configuration settings of peer device 206. In other embodiments, configuration module 216 may reconfigure configuration setting 228 to whitelist a single protocol, such as protocol 226. For example, computing device 202 may only support protocol 226, and configuration module 216 may reconfigure configuration setting 228 to only whitelist supported protocols.

Returning to FIG. 1, at step 160, one or more of the systems described herein may send, by the computing device, a response to the peer device to accept the request. For example, a sending module 218 may, as part of computing device 202 in FIG. 2, send a response 230 to peer device 206 to accept request 220.

The systems described herein may perform step 160 in a variety of ways. In one example, sending module 218 may send response 230 as part of a handshake process to establish an encrypted link. For example, response 230 may represent an EAP response to an EAP request. In other examples, sending module 218 may include additional data in response 230. For example, response 230 may include a different whitelist for protocols whitelisted by computing device 202, such that peer device 206 may whitelist additional protocols based on response 230. In this example, the handshake process may include exchanging whitelisted protocols in addition to exchanging other data, such as encryption keys, between computing device 202 and peer device 206.

In some embodiments, the systems and methods disclosed herein may further include reception module 208 receiving, over the encrypted link, a protocol packet of a whitelisted protocol without encryption and/or a packet of a different protocol type with encryption. Similarly, sending module 218 may further send, over the encrypted link, a protocol packet of the whitelisted protocol without encryption and/or a packet of the different protocol type with encryption. In some examples, the term "packet" may refer to a contained unit of data that is packaged to be easily transmittable. In these examples, a protocol packet may represent a data packet that adheres to a particular network protocol and/or that describes a protocol.

In the example of FIG. 4, authenticators 402(1) and 402(2) may establish an encrypted link 404 based on response 230 of FIG. 2 and the handshake process between computing device 202 and peer device 206. In this example, a protocol packet 410 may be of a whitelisted protocol type, such as protocol 226, and may be sent from computing device 202 to peer device 206 without encryption. In contrast, a packet 412 may represent a different data type, such as a different protocol type 414 not in whitelist 224. In this example, packet 412 may follow a typical procedure of an encryption 406 by peer device 206 before sending and a decryption 408 by computing device 202 after receiving.

In some embodiments, identification module 210 of computing device 202 may further identify a secure channel index in request 220. In these embodiments, configuration module 216 may further automatically configure a secure channel based on the secure channel index. In some examples, the term "channel" may refer to a medium for transmitting data, such as in network transmissions. In these examples, a secure channel index may represent a list of available channels, and particularly secured channels, for data transmission. In other embodiments, configuration module 216 may configure additional settings of computing device 202 to comply with settings of peer device 206 and/or setting of encrypted link 404.

Figure 5:
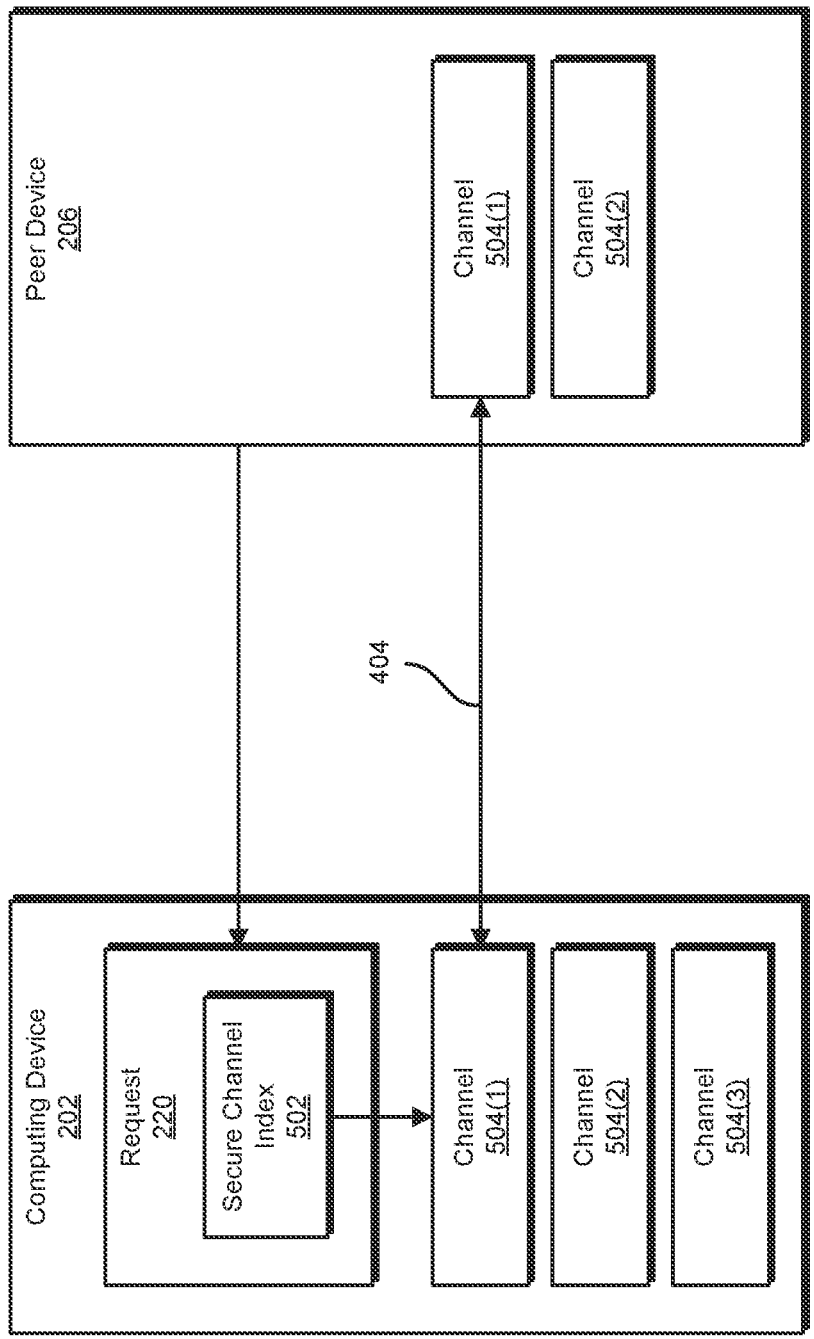
FIG. 5 is a block diagram of an example establishment of an example secure channel.

For example, as shown in FIG. 5, computing device 202 may include channels 504(1)-(3). In this example, peer device 206 may include similar channels 504(1)-(2) but not channel 504(3). In this example, request 220 may include a secure channel index 502 that includes channels 504(1)-(2), and computing device 202 may select from secure channel index 502 to establish a secure channel of channel 504(1) for encrypted link 404. In other examples, computing device 202 and peer device 206 may negotiate a preferred secure channel during the handshake process.

Figure 6:
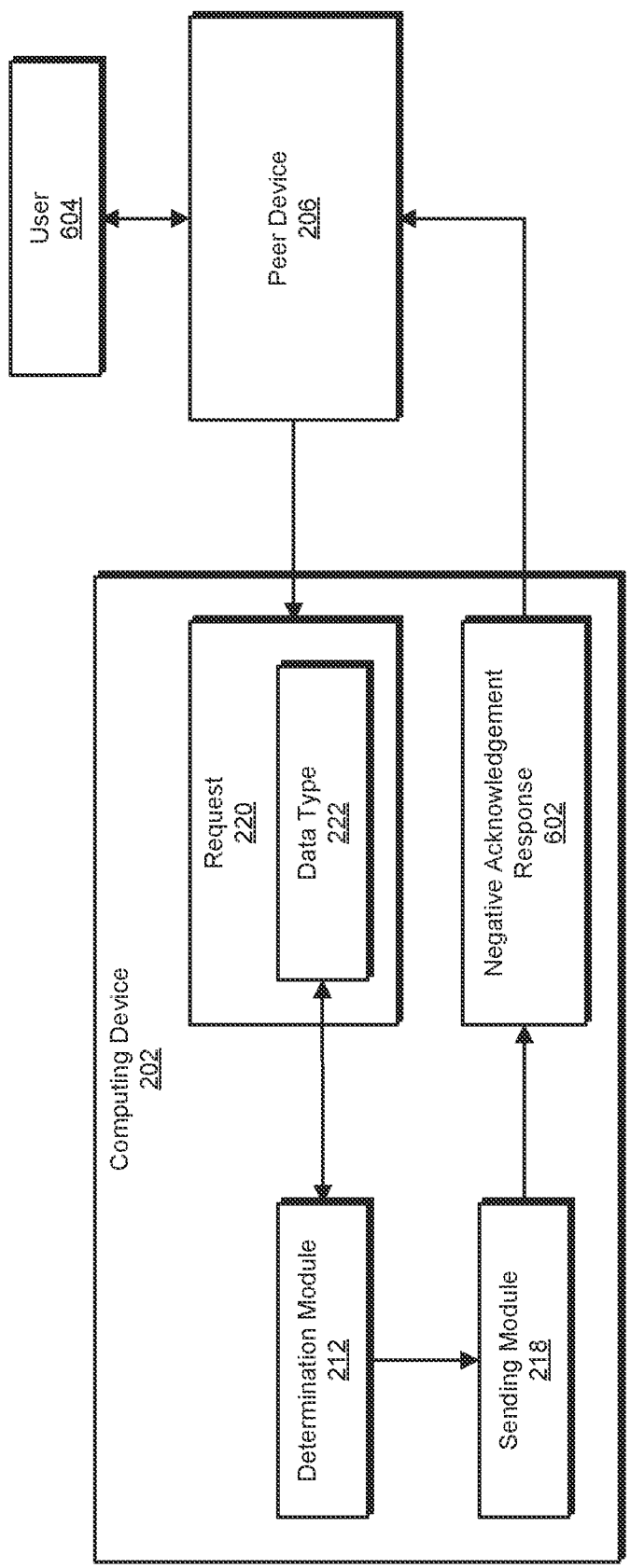
FIG. 6 is a block diagram of an example negative acknowledgement response.

In some examples, and as illustrated in FIG. 6, determination module 212 of computing device 202 may determine that data type 222 is unsupported by computing device 202. In the example of FIG. 6, sending module 218 may send a negative acknowledgement response 602 to peer device 206. In some examples, the term "negative acknowledgement" may refer to a signal indicating a negative or no response to a received request. In these examples, sending module 218 may send negative acknowledgement response 602 to peer device 206 by sending an indication of a mismatch in configuration setting 228 of computing device 202 and/or by notifying a user 604 of peer device 206 of the mismatch in configuration setting 228 based on the negative acknowledgement (NAK). In other examples, negative acknowledgement response 602 may indicate an unsupported authentication type for the requested encrypted link or that computing device 202 could not parse request 220.

Figure 7:
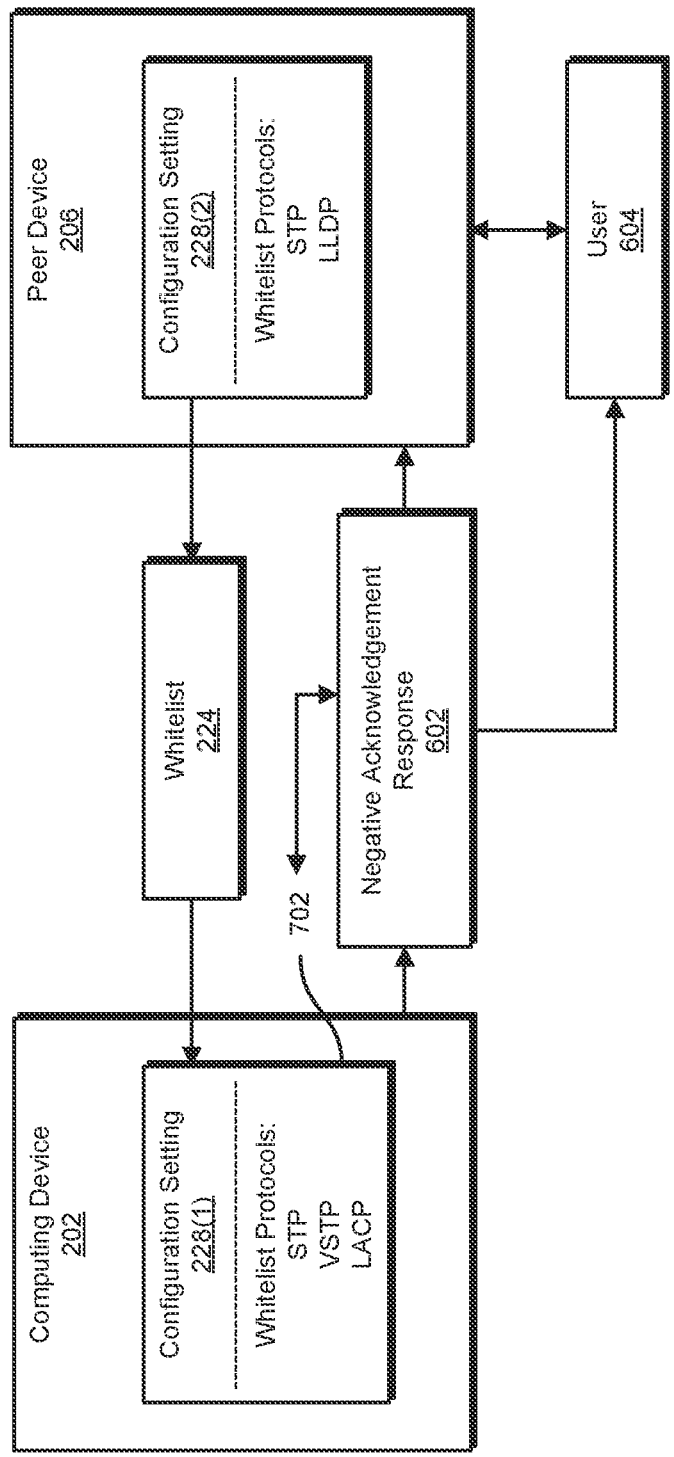
FIG. 7 is a block diagram of an example mismatch in example configuration settings.

As shown in FIG. 7, peer device 206 may sent whitelist 224 to reflect a configuration setting 228(2) that whitelists a number of protocols, including Spanning Tree Protocol (STP) and Link Layer Discovery Protocol (LLDP). In this example, a configuration setting 228(1) of computing device 202 may whitelist certain protocols, including STP, virtual local area network STP (VSTP), and Link Aggregation Control Protocol (LACP). In this example, determination module 212 may determine that configuration settings 228 (1)-(2) include a mismatch 702 such that computing device 202 is unable to whitelist LLDP, and sending module 218 may send negative acknowledgement response 602 to relay mismatch 702 to peer device 206. In this example, user 604 of peer device 206 may be notified, such as via an alarm or a log of peer device 206. In this example, user 604 may perform additional functions to resolve mismatch 702, such as by selecting alternate protocols to whitelist. In other examples, negative acknowledgement response 602 may include additional protocols, such as VSTP and LACP, for peer device 206 to also whitelist. By ensuring configuration settings 228(1) and 228(2) reflect similar whitelists of protocols, the disclosed systems and methods may then establish a session using a whitelisted protocol, such as STP. Additionally, the disclosed systems and methods may resolve differences in whitelisted protocols and configuration settings between multiple peer devices, including computing device 202, peer device 206, and/or other devices in network 204. In these examples, whitelists may be exchanged each time two peer devices attempt to establish a secure link. In these examples, all peer devices within a network may whitelist the same protocols.

As explained above in connection with method 100 in FIG. 1, the disclosed systems and methods may, by automating the process of detecting and configuring whitelisted protocols, configure a secured link between peer devices without a need for manual intervention. Specifically, the disclosed systems and methods may first receive a request to establish an encrypted link sent by one peer device to another peer device. The receiving peer device may then identify a data type of the request and determine the data type is supported. The receiving peer device may additionally extract a whitelist of protocols to forego encryption. The disclosed systems and methods may also configure a setting of the receiving peer device to whitelist one or more protocols from the extracted whitelist. The receiving peer device may subsequently send a response to accept the request to establish the encrypted link. Additionally, the systems and methods described herein may send another whitelist of protocols from the receiving peer device to the sending peer device to ensure both peer devices whitelist the same protocols. Furthermore, the disclosed systems and methods may negotiate a secure channel to establish the encrypted link between the peer devices.

By bypassing encryption of certain protocol packets during the process of authenticating a secure link, the disclosed systems and methods may avoid dropping data packets necessary to establishing specific protocols between peer devices. Additionally, by including the whitelist of protocols in the initial request to establish the link, the disclosed systems and methods may configure device settings at the beginning of the process to resolve differences in the configurations of the peer devices and reduce the potential for dropped packets while waiting for the link to be established. Thus, the systems and methods described herein may improve the configuration of secure links.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

The term "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs), Application-Specific Integrated Circuits (ASICs), Graphics Processing Units (GPUs), Systems on Chips (SoCs), portions of one or more of the same, variations or combinations of one or more of the same, or any other suitable physical processor.

Although illustrated as separate elements, the modules described and/or illustrated herein may represent portions of a single module or application or multiple modules or applications. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive a request to establish an encrypted link to be transformed, transform the request, output a result of the transformation to extract a whitelist of protocols, use the result of the transformation to configure settings to whitelist protocols, and store the result of the transformation to respond to the request. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
 receiving, by a computing device, a request to establish an encrypted link from a peer device in a network;
 identifying, by the computing device, a data type of the request to establish the encrypted link;
 determining, by the computing device, that the data type is supported by the computing device;
 extracting, by the computing device from the request, a whitelist of protocols to send without encryption;
 automatically reconfiguring, by the computing device, a configuration setting of the computing device to whitelist at least one protocol from the whitelist of protocols; and
 sending, by the computing device, a response to the peer device to accept the request.

2. The method of claim 1, wherein the request to establish the encrypted link comprises a protocol layer request to authenticate the encrypted link between the computing device and the peer device.

3. The method of claim 1, wherein the encrypted link comprises at least one of:
 a Media Access Control security (MACsec) link; and
 an Internet Protocol Security (IPsec) link.

4. The method of claim 1, wherein the data type comprises an expanded data type set by an authenticator of the peer device.

5. The method of claim 1, further comprising at least one of:
 receiving, by the computing device over the encrypted link, a protocol packet of a whitelisted protocol without encryption;
 receiving, by the computing device over the encrypted link, a packet of a different protocol type with encryption;
 sending, by the computing device over the encrypted link, the protocol packet of the whitelisted protocol without encryption; and
 sending, by the computing device over the encrypted link, the packet of the different protocol type with encryption.

6. The method of claim 1, further comprising:
 identifying, by the computing device, a secure channel index in the request to establish the encrypted link; and
 automatically configuring, by the computing device, a secure channel based on the secure channel index.

7. The method of claim 1, further comprising:
 determining, by the computing device, that the data type is unsupported by the computing device; and
 sending, by the computing device, a negative acknowledgement response to the peer device.

8. The method of claim 7, wherein sending the negative acknowledgement response to the peer device comprises at least one of:
 sending an indication of a mismatch in the configuration setting of the computing device; and
 notifying a user of the peer device of the mismatch in the configuration setting of the computing device based on the negative acknowledgement response.

9. A system comprising:
 at least one memory device;
 a reception module, stored in the at least one memory device, that receives, by a computing device, a request to establish an encrypted link from a peer device in a network;
 an identification module, stored in the at least one memory device, that identifies, by the computing device, a data type of the request to establish the encrypted link;
 a determination module, stored in the at least one memory device, that determines, by the computing device, that the data type is supported by the computing device;
 an extraction module, stored in the at least one memory device, that extracts, by the computing device from the request, a whitelist of protocols to send without encryption;
 a configuration module, stored in the at least one memory device, that automatically reconfigures, by the computing device, a configuration setting of the computing device to whitelist at least one protocol from the whitelist of protocols;
 a sending module, stored in the at least one memory device, that sends, by the computing device, a response to the peer device to accept the request; and
 at least one processor that executes the reception module, the identification module, the determination module, the extraction module, the configuration module, and the sending module.

10. The system of claim 9, wherein the request to establish the encrypted link comprises a protocol layer request to authenticate the encrypted link between the computing device and the peer device.

11. The system of claim 9, wherein the encrypted link comprises at least one of:
 a Media Access Control security (MACsec) link; and
 an Internet Protocol Security (IPsec) link.

12. The system of claim 9, wherein the data type comprises an expanded data type set by an authenticator of the peer device.

13. The system of claim 9, further comprising at least one of:
 the reception module that further receives, by the computing device over the encrypted link, at least one of:
  a protocol packet of a whitelisted protocol without encryption; and
  a packet of a different protocol type with encryption; and
 the sending module that further sends, by the computing device over the encrypted link, at least one of:
  the protocol packet of the whitelisted protocol without encryption; and
  the packet of the different protocol type with encryption.

14. The system of claim 9, wherein:
 the identification module further identifies, by the computing device, a secure channel index in the request to establish the encrypted link; and the configuration module further automatically configures, by the computing device, a secure channel based on the secure channel index.

15. The system of claim 9, wherein:
the determination module further determines, by the computing device, that the data type is unsupported by the computing device; and
the sending module further sends, by the computing device, a negative acknowledgement response to the peer device.

16. The system of claim 15, wherein the sending module sends the negative acknowledgement response to the peer device by at least one of:
sending an indication of a mismatch in the configuration setting of the computing device; and
notifying a user of the peer device of the mismatch in the configuration setting of the computing device based on the negative acknowledgement response.

17. A non-transitory computer-readable medium comprising one or more computer-executable instructions that, when executed by at least one processor of a computing device, cause the computing device to:
receive, by the computing device, a request to establish an encrypted link from a peer device in a network;
identify, by the computing device, a data type of the request to establish the encrypted link;
determine, by the computing device, that the data type is supported by the computing device;
extract, by the computing device from the request, a whitelist of protocols to send without encryption;
automatically reconfigure, by the computing device, a configuration setting of the computing device to whitelist at least one protocol from the whitelist of protocols; and
send, by the computing device, a response to the peer device to accept the request.

18. The non-transitory computer-readable medium of claim 17, wherein the request to establish the encrypted link comprises a protocol layer request to authenticate the encrypted link between the computing device and the peer device.

19. The non-transitory computer-readable medium of claim 17, wherein the encrypted link comprises at least one of:
a Media Access Control security (MACsec) link; and
an Internet Protocol Security (IPsec) link.

20. The non-transitory computer-readable medium of claim 17, wherein the data type comprises an expanded data type set by an authenticator of the peer device.

* * * * *